United States Patent
Strehler et al.

(10) Patent No.: US 11,152,164 B2
(45) Date of Patent: Oct. 19, 2021

(54) GRAIN BIN SUMP CONTROL WITH AUTOMATIC INTERMEDIATE SUMP LOCK-OUT ASSEMBLY

(71) Applicant: CTB, Inc., Milford, IN (US)

(72) Inventors: Nathan W. Strehler, Bremen, IN (US); Adam K. Gutwein, Goshen, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 17/144,827

(22) Filed: Jan. 8, 2021

(65) Prior Publication Data

US 2021/0217563 A1 Jul. 15, 2021

Related U.S. Application Data

(60) Provisional application No. 62/960,970, filed on Jan. 14, 2020.

(51) Int. Cl.
*H01H 9/28* (2006.01)
*B65G 65/46* (2006.01)

(52) U.S. Cl.
CPC ........... *H01H 9/283* (2013.01); *B65G 65/466* (2013.01); *B65G 2201/042* (2013.01)

(58) Field of Classification Search
CPC .................. H01H 9/283; B65G 65/466; B65G 2201/042; B65D 88/26; B65D 83/06
USPC ......... 200/43.02, 43.03, 43.04, 43.05, 43.06, 200/43.07, 43.08, 43.09, 43.11, 43.12, 200/43.13, 43.14, 43.15, 43.16, 43.17, 200/43.18, 43.19, 43.21, 43.22
See application file for complete search history.

(56) References Cited

U.S. PATENT DOCUMENTS

| | | | |
|---|---|---|---|
| 3,233,755 A * | 2/1966 | Glenn | B65G 65/466 414/310 |
| 6,534,735 B1 * | 3/2003 | Czarnecki | H02B 1/066 200/293 |
| 2006/0180232 A1 | 8/2006 | Glewwe et al. | |

(Continued)

FOREIGN PATENT DOCUMENTS

| | | |
|---|---|---|
| CN | 102424219 A | 4/2012 |
| EP | 3256407 A1 | 12/2017 |

OTHER PUBLICATIONS

BROCK® Grain Management Systems, Farm Bin Grain Unloading Systems, Harvest-Time® Tube Auger Unloading System, Jul. 2014.

(Continued)

*Primary Examiner* — Edwin A. Leon
*Assistant Examiner* — Iman Malakooti
(74) *Attorney, Agent, or Firm* — Harness, Dickey & Pierce, P.L.C.

(57) ABSTRACT

A lock-out pinion can be coupled to a center sump control shaft to rotate therewith. A lock-out slide can include a rack and a blocking cover. A lock-out guide can be coupled to the sump control housing and can form a guide channel. The lock-out slide can be received in the guide channel with the lock-out pinion drivingly coupled to the rack to move the lock-out slide along the guide channel from a lock-out position in which the blocking cover prevents rotation of the intermediate sump control shaft with the driving handle, to an unlocked position in which the blocking cover permits rotation of the intermediate sump control shaft with the driving handle, in response to manual rotation of the center sump control shaft in the center sump opening direction.

25 Claims, 9 Drawing Sheets

(56) References Cited

U.S. PATENT DOCUMENTS

| | | |
|---|---|---|
| 2016/0083177 A9 | 3/2016 | Oren et al. |
| 2020/0290813 A1* | 9/2020 | Walker .................. G05G 1/025 |
| 2020/0290826 A1* | 9/2020 | Gutwein ............. B65G 65/466 |
| 2020/0290827 A1* | 9/2020 | Walker .................. B65G 33/10 |
| 2021/0101751 A1* | 4/2021 | Walker .................. B65G 33/14 |

OTHER PUBLICATIONS

BROCK® U-Trough Bin Unload System, All Models, Assembly & Operations Manual, Part No. 30553 R1, Oct. 2008.
BROCK® Tube Bin Unload System, 8"/10"×15'-60' Models, Assembly & Operation Manual, Part No. 14471 R1, Jul. 2015.
International Search Report and Written Opinion in corresponding International Application No. PCT/US2021/013214, dated Apr. 14, 2021.

* cited by examiner

GRAIN BIN SUMP CONTROL WITH AUTOMATIC INTERMEDIATE SUMP LOCK-OUT ASSEMBLY

CROSS-REFERENCE TO RELATED APPLICATIONS

This application claims the benefit of U.S. Provisional Application No. 62/960,970, filed on Jan. 14, 2020. The entirety of the above application is hereby incorporated herein by reference.

FIELD

The present disclosure relates to grain bin sump control for grain bins.

BACKGROUND

This section provides background information related to the present disclosure which is not necessarily prior art.

Grain bins typically have a center sump, and one or more intermediate sumps positioned between the center sump and the outer wall of the grain bins through which grain is unloaded from the bin. It is important to initially open and unload grain from the center sump to insure the pressure on the outer wall of the grain bin remains balanced. Only after enough grain is removed from the grain bin so that differential pressures on the outer wall are manageable, should the intermediate sump(s) be opened and grain unloaded from the intermediate sumps.

Figure 1:
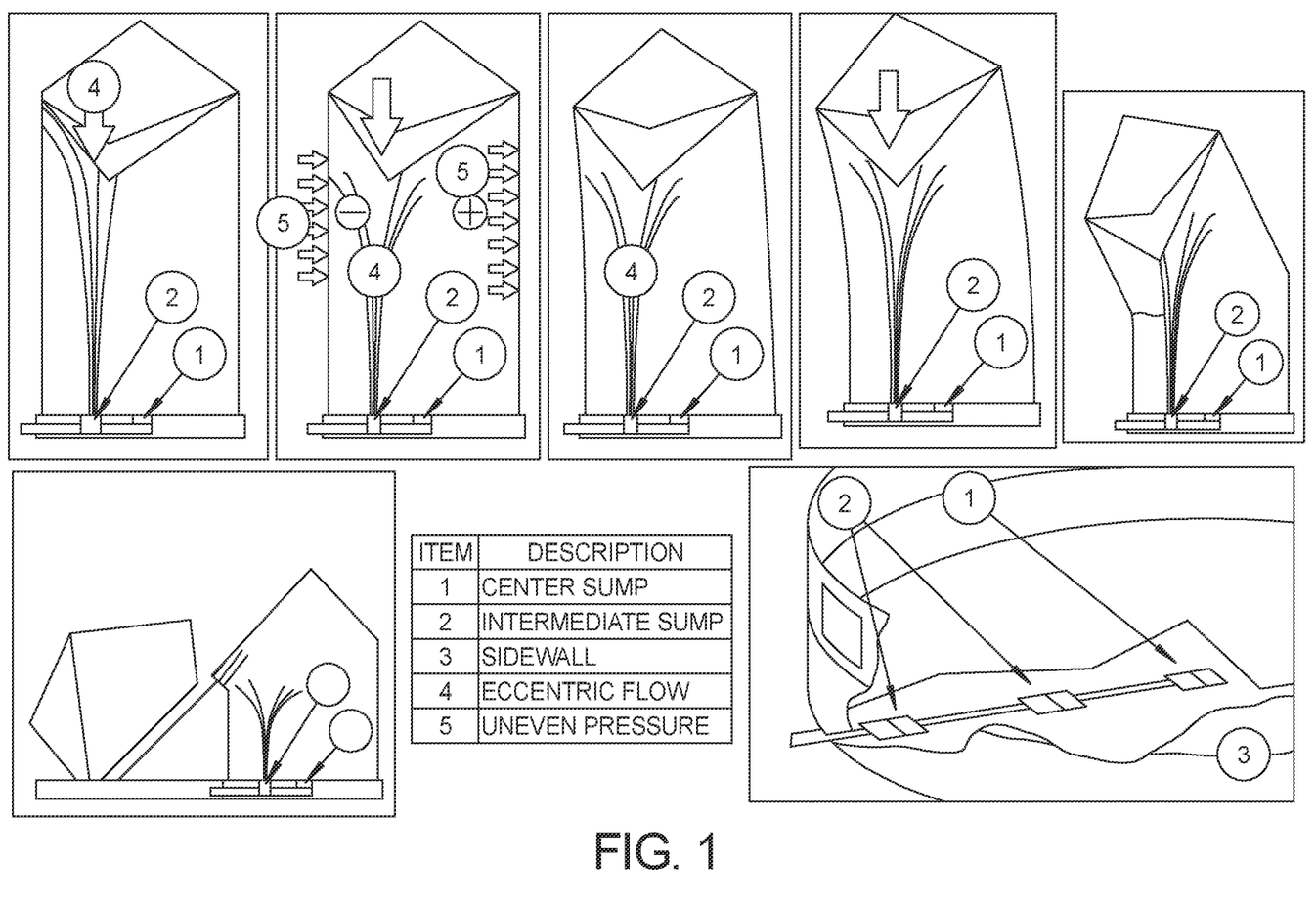
FIG. 1 provides illustrations of grain exerting unbalanced pressure on the outer wall of a gran bin that can cause it to buckle, and could ultimately lead to the grain bin collapsing as shown.

If the intermediate sump(s) are opened too early, the grain can exert an unbalanced pressure on the outer wall of the gran bin that can cause it to buckle, and could ultimately lead to the grain bin collapsing as shown in FIG. 1.

Grain bins typically include a pair of sump control shafts; a center sump control shaft and an intermediate sump control shaft. During unloading, a single handle can initially be used to rotate the center sump control shaft to open the center sump. Then, the single handle can be moved to the intermediate sump control shaft and used to open the intermediate sump(s).

SUMMARY

This section provides a general summary of the disclosure, and is not a comprehensive disclosure of its full scope or all of its features.

In accordance with aspects of the present disclosure, a grain bin sump control can include a sump control housing. A center sump control shaft can extend from the sump control housing and can be operably coupled to a center sump gate to move the center sump gate of a center sump from a closed center gate position to an open center gate position in response to manual rotation of the center sump control shaft in a center sump opening direction. An intermediate sump control shaft can extend from the sump control housing and can be operably coupled to an intermediate sump gate of an intermediate sump and rotatable to move the intermediate sump gate from a closed intermediate gate position to an open intermediate gate position in response to manual rotation of the center sump control shaft in an intermediate sump opening direction using a driving handle mounted on the center sump control shaft. An automatic intermediate sump lock-out assembly can include a lock-out pinion, a lock-out slide and a lock-out guide. The lock-out pinion can be coupled to the center sump control shaft to rotate therewith. The lock-out slide can include a rack and a blocking cover. The lock-out guide can be coupled to the sump control housing and can form a guide channel. The lock-out slide can be received in the guide channel with the lock-out pinion drivingly coupled to the rack to move the lock-out slide along the guide channel from a lock-out position in which the blocking cover prevents rotation of the intermediate sump control shaft with the driving handle, to an unlocked position in which the blocking cover permits rotation of the intermediate sump control shaft with the driving handle, in response to manual rotation of the center sump control shaft in the center sump opening direction.

In accordance with an aspect of the present disclosure a grain bin sump control can include a sump control housing. A center sump control shaft can extend from the sump control housing and can be operably coupled to a center sump gate to move the center sump gate of a center sump from a closed center gate position to an open center gate position in response to manual rotation of the center sump control shaft in a center sump opening direction using a driving handle mounted on the center sump control shaft. An intermediate sump control shaft can extend from the sump control housing and can be operably coupled to an intermediate sump gate of an intermediate sump and rotatable to move the intermediate sump gate from a closed intermediate gate position to an open intermediate gate position in response to manual rotation of the center sump control shaft in an intermediate sump opening direction using the driving handle mounted on the center sump control shaft. An automatic intermediate sump lock-out assembly can include a lock-out pinion, a lock-out slide and a lock-out guide. The lock-out pinion can be coupled to the center sump control shaft to rotate therewith. The lock-out slide can include a rack and a blocking cover that includes a blocking cover leg. The lock-out guide can be coupled to the sump control housing and can form a guide channel. The lock-out slide can be received in the guide channel with the lock-out pinion drivingly coupled to the rack to move the lock-out slide along the guide channel from a lock-out position in which the blocking cover leg extends over a handle mounting end of the intermediate sump control shaft to prevent the driving handle from being mounted on the intermediate sump control shaft, to an unlocked position in which the blocking cover leg is positioned away from the handle mounting end of the intermediate sump control shaft to permit the driving handle to be mounted on the intermediate sump control shaft from the handle mounting end of the intermediate sump control shaft, in response to manual rotation of the center sump control shaft in the center sump opening direction.

In accordance with aspects of the present disclosure, the unlocked position of the lock-out slide can correspond to the open center gate position, including a fully open center gate position of the center sump. The lock-out position of the lock-out slide can correspond to the closed center gate position that can include a partially closed center gate position that is at least half way from a fully closed center gate position to the fully open center gate position.

In accordance with aspects of the present disclosure, the driving handle can be selectively drivingly mountable on each of the center sump control shaft and the intermediate sump control shaft, respectively. The guide channel can be a U-shaped channel and the lock-out slide can include a corresponding U-shaped slide base received in the U-shaped channel. Each of the lock-out slide and the lock-out guide can be formed of sheet metal pieces, and the sheet metal pieces can be shaped so that no cut edges of any of the sheet metal pieces are engaged against any other part as the lock-out slide moves along the guide channel from the lock-out position to the unlocked position.

In accordance with aspects of the present disclosure, the lock-out slide and the lock-out guide can include a locking protrusion and a locking recess that are engaged with each other to prevent removal of the lock-out slide from the guide channel. The locking recess can include a first recess in the lock-out slide and a second recess in the lock-out guide. The first and second recesses and the locking protrusion can each be provided in an upwardly extending leg of a U-shaped channel of the lock-out guide and of a U-shaped slide base of the lock-out slide, respectively. The locking recess can include a first recess in the lock-out slide and a second recess in the lock-out guide, and the locking protrusion can include a shaft extending through both the first and second recesses. The shaft can be provided by a hasp of a padlock.

In accordance with aspects of the present disclosure, a single piece of slide sheet metal can form the slide, including the rack, the blocking cover, and a U-shaped slide base. The rack can be provided on a first slide leg of the U-shaped slide base, and the blocking cover can be an extension of the first slide leg of the U-shaped slide base. The guide channel can be a U-shaped guide channel. A first single piece of guide sheet metal having an L-shape can form a first channel leg and a channel base of the U-shaped guide channel, and a second single piece of guide sheet metal having an L-shape can form a second channel leg of the U-shaped guide channel and a support leg. The support leg of the second single piece of guide sheet metal can be coupled to the sump control housing with the first single piece of guide sheet metal sandwiched between the support leg of the second single piece of guide sheet metal and the sump control housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 2-10 illustrate one example of a grain bin sump control automatic rack and pinion lock-out assembly 20 in accordance with the present disclosure. Such a grain bin sump control automatic rack and pinion cover assembly can restrict the ability to couple a handle 42 to the intermediate sump control shaft 30 until after the center sump 26 has been initially opened. A center sump control shaft 22 can be operably coupled to an axially movable center sump control rod 24 to move a center gate 26 of a center sump 28 between open and closed center gate 26 positions in response to the center sump control shaft 22 being rotated using the handle 42 in forward and reverse directions, respectively.

Figure 2:
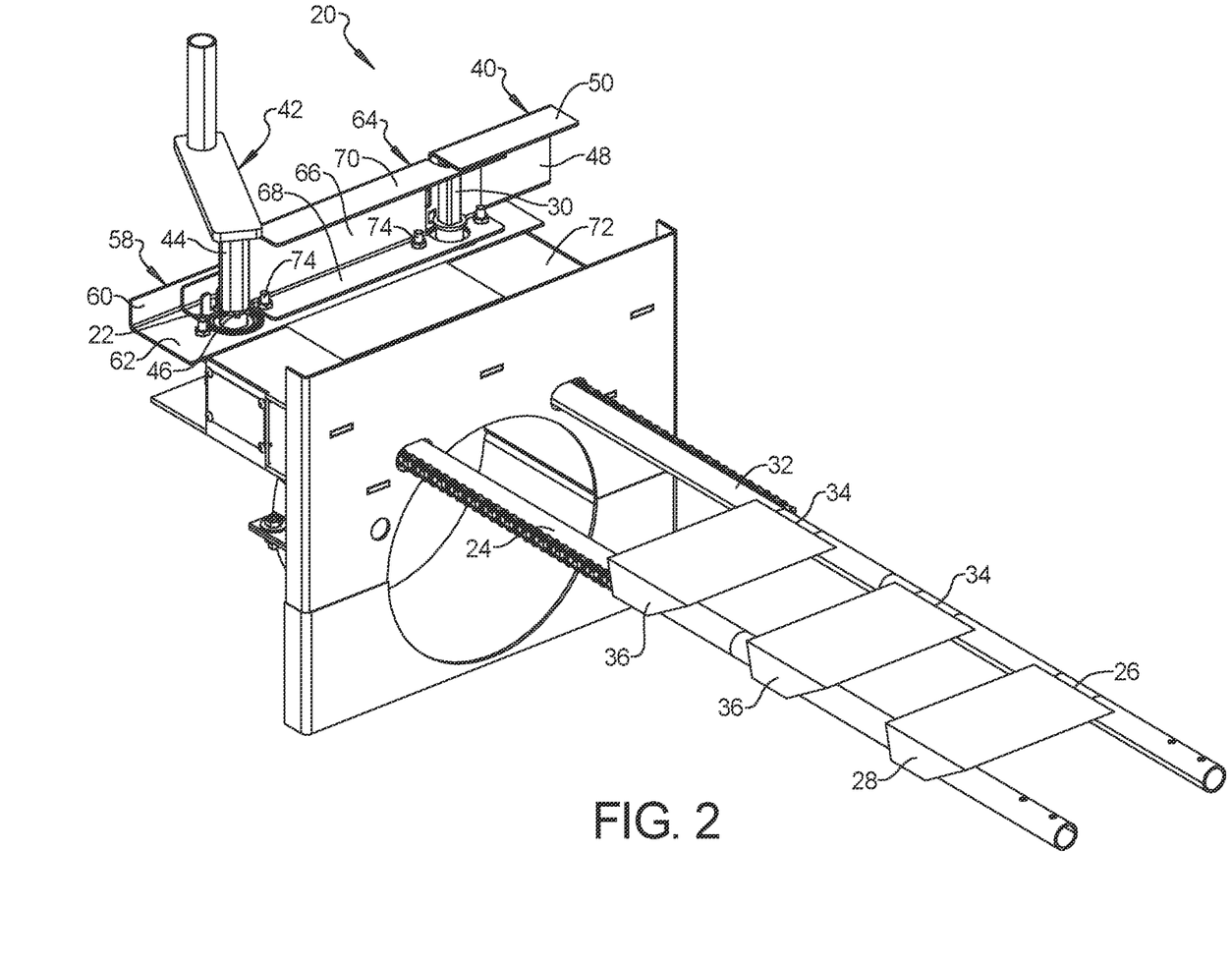
FIG. 2 is a perspective view of various components of a grain sump control including an example of an automatic intermediate sump lock-out assembly in accordance with the present disclosure.
Figure 3:
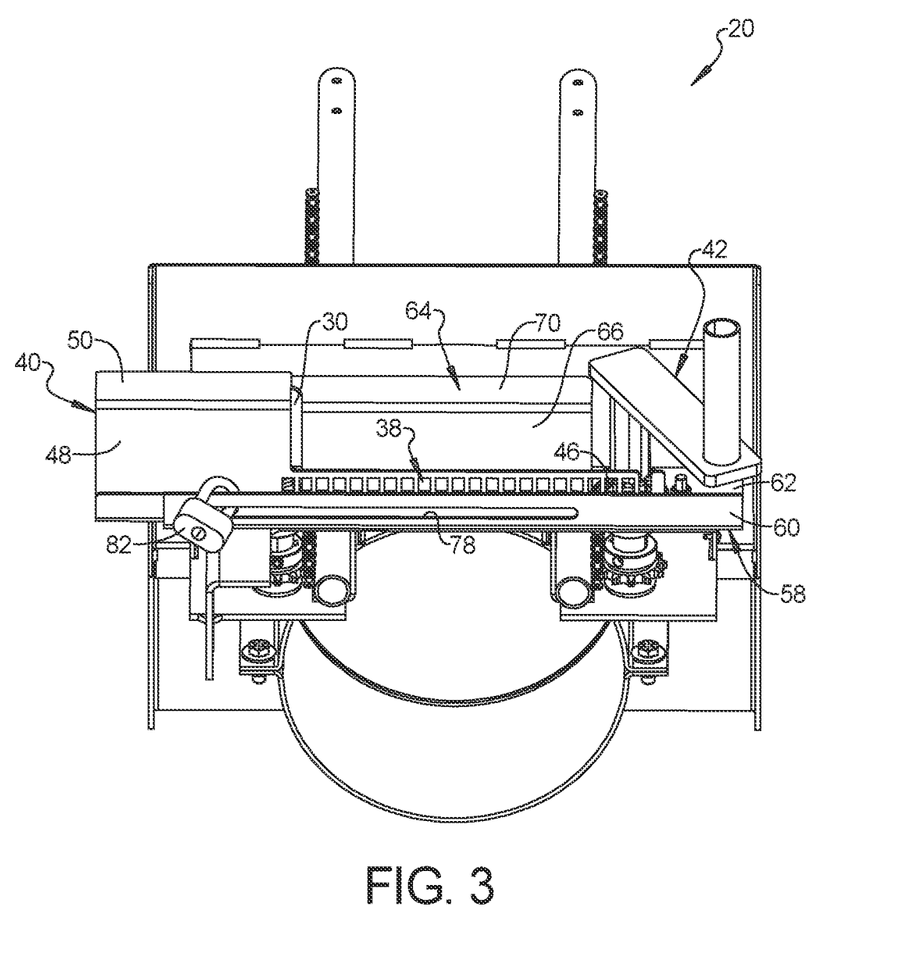
FIG. 3 is a perspective view of various components of a grain sump control including the example automatic intermediate sump lock-out assembly of FIG. 2 in a lock-out configuration.
Figure 4:
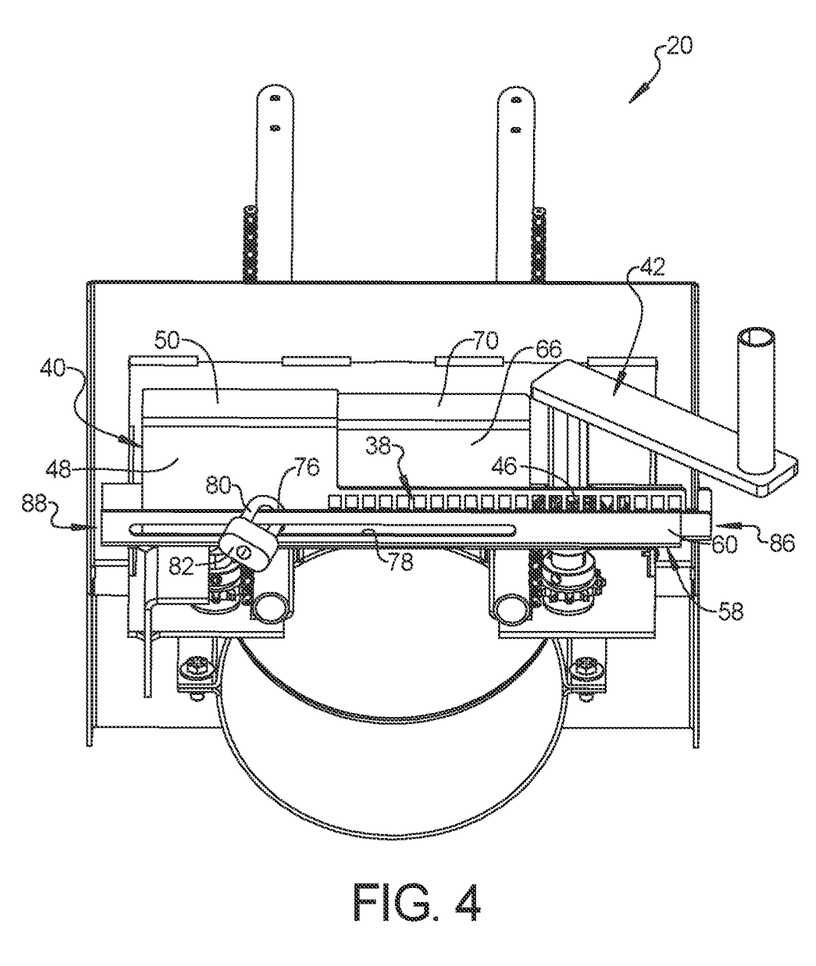
FIG. 4 is a perspective view similar to FIG. 3 including the example automatic intermediate sump lock-out assembly of FIG. 2 also in a lock-out configuration.
Figure 5:
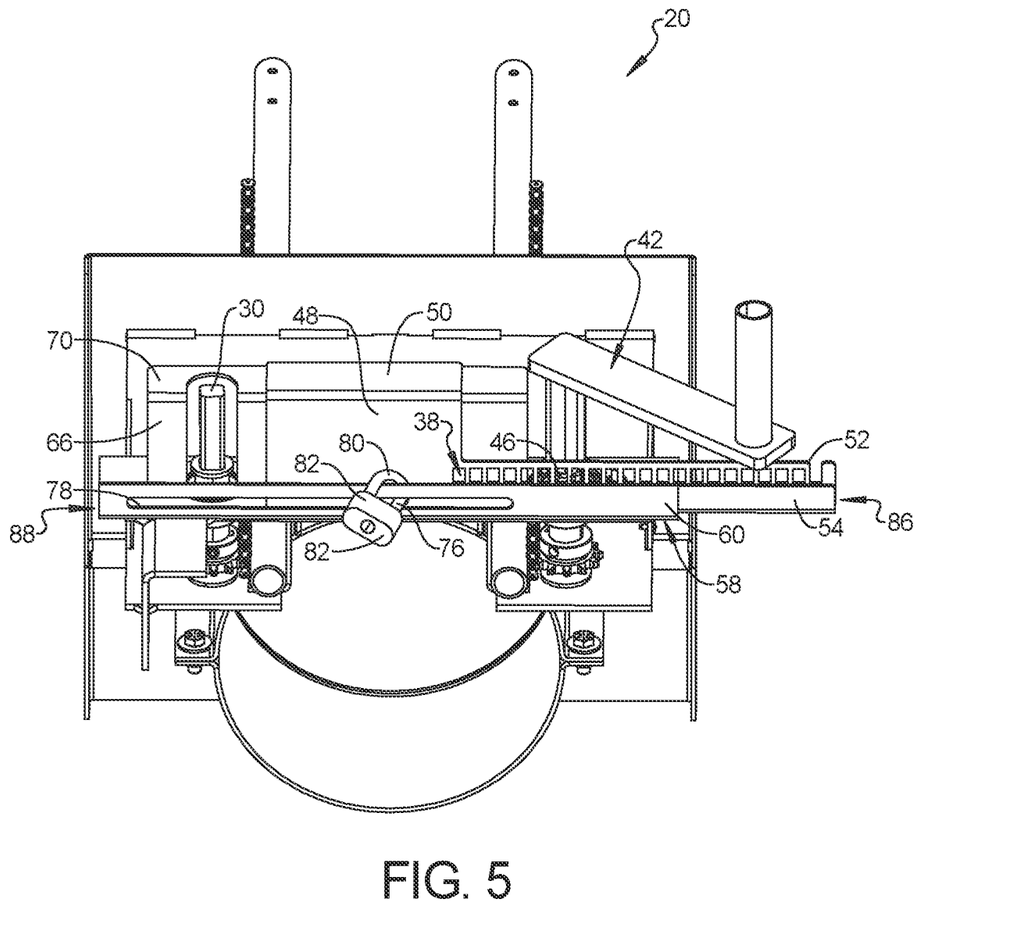
FIG. 5 is a perspective view similar to FIG. 3 including the example automatic intermediate sump lock-out assembly of FIG. 2 in an unlocked configuration.

Similarly, an intermediate sump control shaft 30 can be operably coupled to an axially movable intermediate sump control rod 32 to move an intermediate gate 34 of an intermediate sump 36 between open and closed intermediate gate 34 positions in response to the intermediate sump control shaft 30 being rotated using the handle 42 in forward and reverse directions, respectively. As illustrated in FIG. 2, the rotating intermediate sump control shaft 30 and axially movable intermediate sump control rod 32, can simultaneously open and close a plurality of intermediate gates 34 for a plurality of intermediate sumps 36.

The driving handle 42 can be selectively mounted on the center sump control shaft 22 to rotate the shaft 22 and control the opening and closing of the gate 26 of the center sump 28, or on the intermediate sump control shaft 30 to rotate the shaft 30 and control the opening and closing of the gate(s) 34 of the intermediate sump(s) 36. As in the illustrated example, the driving handle 42 and the control shafts 22, 30 can include cooperating driving surfaces in the form of square cross-sectional shapes provided by the shafts 22, 30 and a sleeve 44 of the handle 42. Other cooperating driving surface examples include splines and recesses, and other forms of protrusions and recesses, such as a pin extending through each control shaft 22, 30 that mates with a slot through the sleeve 44 of the driving handle 42 or vice versa. Other options are possible.

A cover rack 38 can be coupled to an intermediate control shaft cover 40. The intermediate control shaft cover 40 can be movable between a lock-out position in which the cover 40 prevents the driving handle 42 from being mounted on the intermediate sump control shaft 30 (e.g., FIGS. 2 and 3), and an unlocked position in which the cover permits the handle 42 to be mounted on the intermediate sump control shaft 30 (e.g., FIGS. 6 and 7).

A cover pinion 46 can be operably coupled to the center sump control shaft 22 for rotation thereby. As in the illustrated example, the cover pinion 46 can be mounted onto the center sump control shaft 22. Also as in the illustrated example, the cover pinion 46 and the center sump control shaft 22 can include cooperating driving surfaces in the form of square cross-sectional shapes provided by the center sump control shaft 22 and the cover pinion 46. Other cooperating driving surface examples are possible, including along the lines discussed above with respect to the control shafts 22, 30 and the driving handle 42.

A single piece component can comprise the lock-out slide 92, including both the blocking cover 40 and cover rack 38, as opposed to multiple pieces integrated together. For example, a single piece of sheet metal can comprise both the cover 40 and the cover rack 38. Sheet metal has two major faces or surfaces opposite each other that define the length and width dimensions of the sheet. In contrast, cut edge surfaces extend between the major faces or surfaces to define the thickness dimension of the sheet metal, which is constant throughout the sheet.

The blocking cover 40 can have an L-shape in cross section, e.g., sheet metal bent into such an L-shape. A support leg 48 of such an L-shaped cover 40 can extend alongside of the intermediate sump control shaft 30 and a cover leg 50 of the L-shape can extend over a distal end of the intermediate sump control shaft 30 sufficiently to prevent the driving handle 42 from being mounted onto the intermediate sump control shaft 30, when the cover 42 is in the lock-out position (e.g., FIGS. 2 and 3). For example, the support leg 48 can extend parallel to a central axis (i.e., the axis of rotation) of the intermediate sump control shaft 30, and the cover leg 50 can extend perpendicular to the support leg 48. Further, the cover leg 50 can extend perpendicular to the central axis of the intermediate sump control shaft 30.

The cover rack 38 can be provided on one upwardly extending pinion leg 52 of a U-shaped channel or slide base 86. For example, the cover rack 38, can be provided by cutting a series of openings through the leg 52 of the U-shaped slide base 86 along a length thereof. As in the illustrated embodiment, the support leg 48 can be an extension of the rack leg 52, which can both be formed of a single piece of sheet metal. Further, the cover rack 38 can be provided on an elongated arm extending from the support leg 40 of the cover 40. The cover 40 and cover rack 38 can slide on a base leg 56 of the U-shaped base 86 between the two upwardly extending legs 52, 54 of the U-shaped channel 88 of the lock-out guide 90. Thus, the cover 40 and cover pinion 46 can slide on a major surface of sheet metal, without any cut edge surfaces needing to slide against any contacting surface. Additionally or alternatively, a low friction material can be provided on contacting sliding surfaces, bearings, and other know friction reduction components, materials, and methods may be used to reduce friction between contacting sliding surfaces of the grain bin sump control 20.

The U-shaped channel slide base 86 of the cover 40 and cover rack 38 can slide within the U-shaped outer or guide channel 88 of the lock-out guide 90. This U-shaped guide channel 88 can be formed of two separate sheet metal components 58, 64, each comprising an L-shape in cross-section. A sheet metal base component 58 can include an upwardly extending leg 60 and a base leg 62. A sheet metal support component 64 can include an upwardly extending leg 66 supported by a base leg 68 extending away from the guide channel. Thus, the two upwardly extending legs 60, 66 and the base leg 62 extending between them form the guide channel. Again, the cover 40 and cover pinion 46 can slide along three major surface pairs, 60 and 54, 56 and 62, 52 and 66, of sheet metal, without any cut edge surfaces needing to contact and slide against any other surface.

The sheet metal support component 64 of the lock-out guide 92 can include a cover support leg 70 extending from the upwardly extending leg 66, and can give the metal sheet support component 64 an overall U-shape in cross-section. Thus, the cover 40 can be supported by, and can slide along two more major support surface pairs 66 and 48, 50 and 70, of sheet metal, without any cut edge surfaces needing to contact and slide against any other surface. The sheet metal base component 58 and the sheet metal support component 64 of the cover guide 92 can be coupled to each other and to a sump control housing 72 via fasteners 74, such as nuts and bolts.

The assembly 20 can include a cooperating locking protrusion 76 and locking recess 78 to make it difficult to improperly remove the blocking cover 40 of the lock-out slide 92 from the lock-out guide 90 of the intermediate sump lock-out assembly 20 or to otherwise decouple the cover rack 38 from the cover pinion 46. This can help reduce the chances that the lock-out assembly 20 is unintentionally or intentionally defeated during operation of the sump control shafts 22, 30. As in the illustrated example, the locking protrusion 76 can be carried by the movable cover 40 and cover rack 38 component(s), and a locking recess 78 can be provided on one of the stationary components 58, 64, or vice versa.

As in the illustrated example, the locking protrusion 76 can be a hasp 80 of a padlock 82 and the cooperating locking recess 78 can be a slot. For example, the hasp 80 or other locking protrusion 76 can extend through an aperture 84 through the upwardly extending leg 54 and the slot or other locking recess 78 can be provided through the upwardly extending leg 60 of the U-shaped guide channel. Alternatives to the hasp 80 can include a wide variety of fasteners. In addition, both the aperture 84 and the locking recess 78 can be a slot, so that both the combined lengths of the slotted aperture 84 and the slotted locking recess 78 provide the necessary movement distance between the lock-out and unlock positions of the cover 40. Other examples of locking protrusions 76 and cooperating locking recesses 78 can include a protrusion or spline and a recess or channel integrally formed in adjacent sliding walls, e.g., by providing bends, embossments, etc., in adjacent sliding walls such as 54 and 60. Other options are possible.

Prior to emptying a grain bin, both the center gate 26 of the center sump 28 and the intermediate gate(s) 34 of the intermediate sump(s) are in their closed positions. In this state, the intermediate control shaft cover 40 is positioned over the intermediate sump control shaft 30 in its lock-out position (e.g., FIGS. 2 and 3), which prevents the driving handle 42 from being mounted on the intermediate sump control shaft 30. In contrast, nothing prevents the driving handle 42 from being mounted on the center sump control shaft 22. This helps insure that the center gate 26 is initially opened so that grain is initially removed through the center sump 28.

Because the driving handle 42 is initially mounted on the center sump control shaft 22, there is little reason to move the driving handle 42 until the center gate 26 of the center sump 28 has been completely opened and grain has ceased flowing into the center sump 28 and being conveyed out of the grain bin. For example, should the center sump 28 become blocked or jammed, an emergency sump that is opened using a different mechanism would be used.

As the handle 42 rotates the center sump control shaft 22, the pinion 46 engages the rack 38 to move the cover 40. The cover 40 can continue to cover the intermediate sump control shaft 30 in a lock-out position (e.g., FIG. 4) and prevent the driving handle 42 from being mounted on the intermediate sump control shaft 30 until the center gate 26 of the center sump 28 has been sufficiently, if not completely, opened. For example in some cases, the cover 40 can continue to cover the intermediate sump control shaft 30 in the lock-out position until the center gate 26 reaches a partially closed center gate position that is at least half way from the fully closed center gate position to the fully open center gate position. In some cases, the cover 40 can continue to cover the intermediate sump control shaft 30 in the lock-out position until the center gate 26 reaches a partially closed center gate position that is at least three quarters of the way from the fully closed center gate position to the fully open center gate position.

Figure 6:
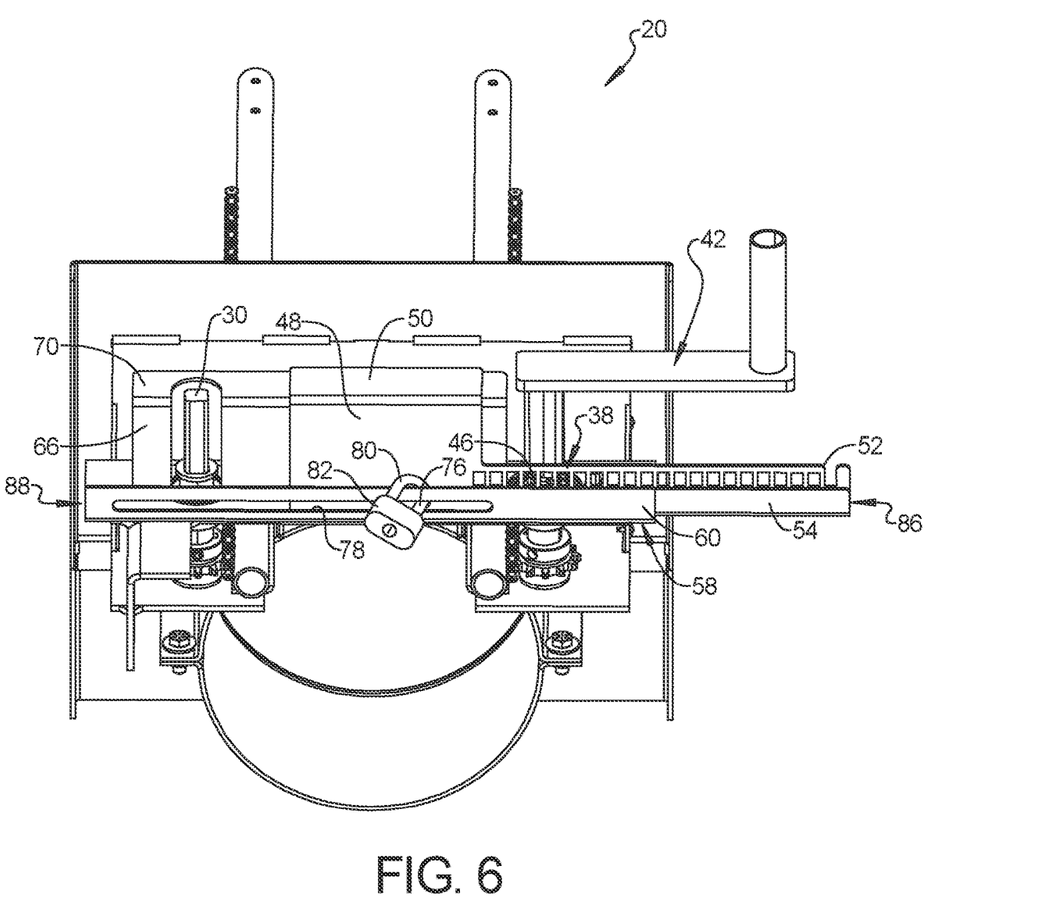
FIG. 6 is a perspective view similar to FIG. 3 including the example automatic intermediate sump lock-out assembly of FIG. 2 also in an unlocked configuration.
Figure 7:
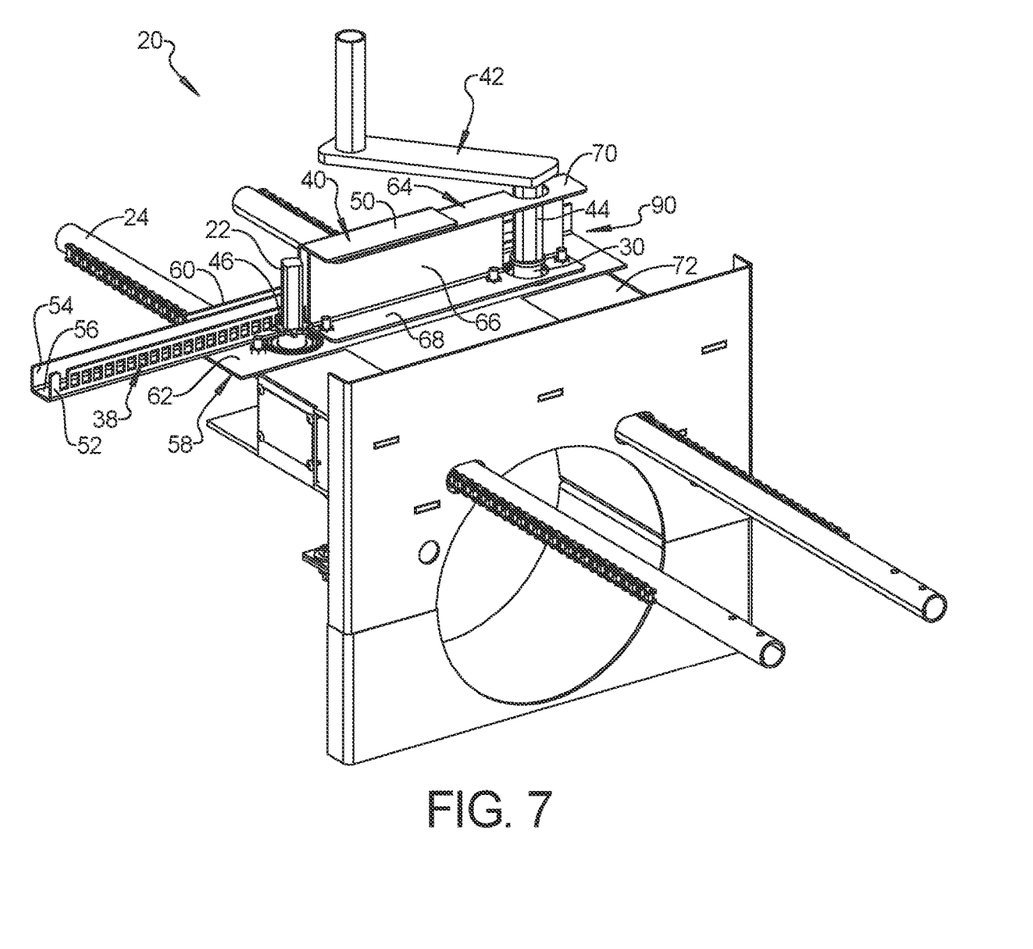
FIG. 7 is another perspective view of various components of a grain sump control including the example automatic intermediate sump lock-out assembly of FIG. 2.
Figure 8:
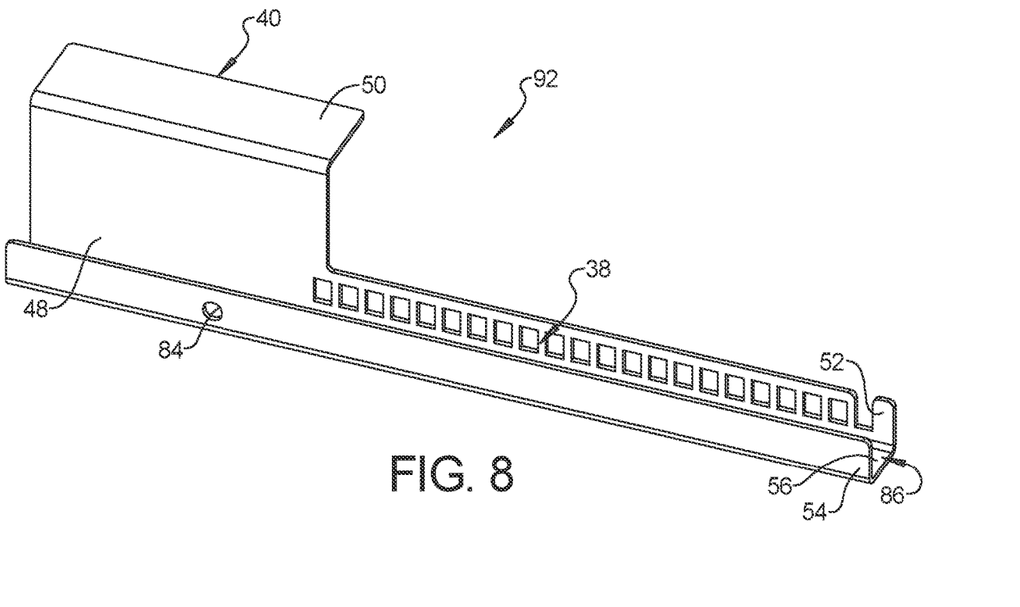
FIG. 8 is a perspective view of the lock-out cover of the example automatic intermediate sump lock-out assembly of FIG. 2.
Figure 9:
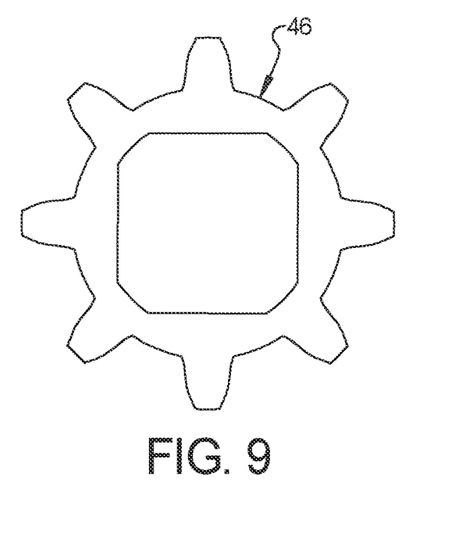
FIG. 9 is a plan view of the lock-out pinion of the example automatic intermediate sump lock-out assembly of FIG. 2.
Figure 10:
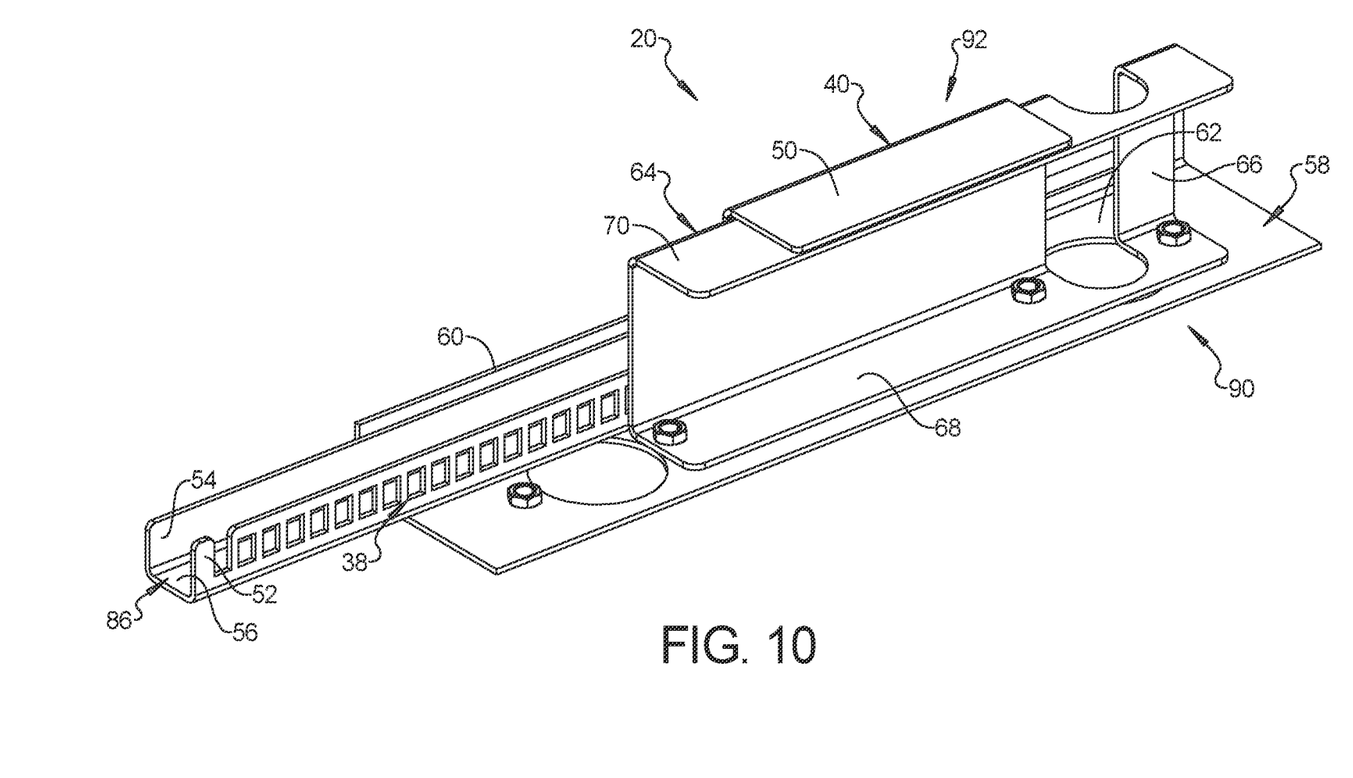
FIG. 10 is a perspective view of the example automatic intermediate sump lock-out assembly of FIG. 2.

Thus, after the center gate 26 has been initially opened, and until the center gate 26 of the center sump 28 has been sufficiently, if not completely, opened, the cover 40 moves into the unlocked position in which the cover permits the handle 42 to be mounted on the intermediate sump control shaft 30 (e.g., FIGS. 6 and 7).

As in the illustrated example, the orientation of the rack 38 and pinion 46 and of the resulting movement of the cover 40 can be perpendicular to the orientation of the axial movement of the center and intermediate sump control rods 24 and 32, respectively, and of any rack and pinion responsible for such control rod movement.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grain bin sump control comprising:
    a sump control housing;
    a center sump control shaft extending from the sump control housing and operably coupled to a center sump gate to move the center sump gate of a center sump from a closed center gate position to an open center gate position in response to manual rotation of the center sump control shaft in a center sump opening direction;
    an intermediate sump control shaft extending from the sump control housing and operably coupled to an intermediate sump gate of an intermediate sump and rotatable to move the intermediate sump gate from a closed intermediate gate position to an open intermediate gate position in response to manual rotation of the center sump control shaft in an intermediate sump opening direction using a driving handle mounted on the center sump control shaft; and
    an automatic intermediate sump lock-out assembly, including:
        a lock-out pinion coupled to the center sump control shaft to rotate therewith;
        a lock-out slide including a rack and a blocking cover; and
        a lock-out guide coupled to the sump control housing and forming a guide channel, and the lock-out slide being received in the guide channel with the lock-out pinion drivingly coupled to the rack to move the lock-out slide along the guide channel from a lock-out position in which the blocking cover prevents rotation of the intermediate sump control shaft with the driving handle, to an unlocked position in which the blocking cover permits rotation of the intermediate sump control shaft with the driving handle, in response to manual rotation of the center sump control shaft in the center sump opening direction.

2. The grain bin sump control of claim 1, wherein the unlocked position of the lock-out slide corresponds to the open center gate position, including a fully open center gate position of the center sump, and the lock-out position of the lock-out slide corresponds to the closed center gate position, including a partially closed center gate position that is at least half way from a fully closed center gate position to the fully open center gate position.

3. The grain bin sump control of claim 1, wherein the driving handle is selectively drivingly mountable on each of the center sump control shaft and the intermediate sump control shaft, respectively.

4. The grain bin sump control of claim 1, wherein the guide channel is a U-shaped channel and the lock-out slide includes a corresponding U-shaped slide base received in the U-shaped channel.

5. The grain bin sump control of claim 1, wherein each of the lock-out slide and the lock-out guide is formed of sheet metal pieces, and the sheet metal pieces are shaped so that no cut edges of any of the sheet metal pieces are engaged against any other part as the lock-out slide moves along the guide channel from the lock-out position to the unlocked position.

6. The grain bin sump control of claim 1, wherein the lock-out slide and the lock-out guide include a locking protrusion and a locking recess that are engaged with each other to prevent removal of the lock-out slide from the guide channel.

7. The grain bin sump control of claim 6, wherein the locking recess includes a first recess in the lock-out slide and a second recess in the lock-out guide, and the first and second recesses and the locking protrusion are each provided in an upwardly extending leg of a U-shaped channel of the lock-out guide and of a U-shaped slide base of the lock-out slide, respectively.

8. The grain bin sump control of claim 6, wherein the locking recess comprises a first recess in the lock-out slide and a second recess in the lock-out guide and the locking protrusion comprises a shaft extending through both the first and second recesses.

9. The grain bin sump control of claim 8, wherein the shaft is provided by a hasp of a padlock.

10. The grain bin sump control of claim 1, wherein a single piece of slide sheet metal forms the slide, including the rack, the blocking cover, and a U-shaped slide base, and wherein the rack is provided on a first slide leg of the U-shaped slide base, and the blocking cover is an extension of the first slide leg of the U-shaped slide base.

11. The grain bin sump control of claim 10, wherein the guide channel is a U-shaped guide channel, and a first single piece of guide sheet metal having an L-shape that forms a first channel leg and a channel base of the U-shaped guide channel, and a second single piece of guide sheet metal having an L-shape that forms a second channel leg of the U-shaped guide channel and a support leg.

12. The grain bin sump control of claim 11, wherein the support leg of the second single piece of guide sheet metal is coupled to the sump control housing with the first single piece of guide sheet metal sandwiched between the support leg of the second single piece of guide sheet metal and the sump control housing.

13. A grain bin sump control comprising:
a sump control housing;
a center sump control shaft extending from the sump control housing and operably coupled to a center sump gate to move the center sump gate of a center sump from a closed center gate position to an open center gate position in response to manual rotation of the center sump control shaft in a center sump opening direction using a driving handle mounted on to the center sump control shaft;
an intermediate sump control shaft extending from the sump control housing and operably coupled to an intermediate sump gate of an intermediate sump to move the intermediate sump gate from a closed intermediate gate position to an open intermediate gate position in response to manual rotation of the center sump control shaft in an intermediate sump opening direction using the driving handle mounted on the intermediate sump control shaft; and
an automatic intermediate sump lock-out assembly, including:
a lock-out pinion coupled to the center sump control shaft to rotate therewith;
a lock-out slide including a rack and a blocking cover that includes a blocking cover leg; and
a lock-out guide coupled to the sump control housing and forming a guide channel, and the lock-out slide being received in the guide channel with the lock-out pinion drivingly coupled to the rack to move the lock-out slide along the guide channel from a lock-out position in which the blocking cover leg extends over a handle mounting end of the intermediate sump control shaft to prevent the driving handle from being mounted on the intermediate sump control shaft, to an unlocked position in which the blocking cover leg is positioned away from the handle mounting end of the intermediate sump control shaft to permit the driving handle to be mounted on the intermediate sump control shaft from the handle mounting end of the intermediate sump control shaft, in response to manual rotation of the center sump control shaft in the center sump opening direction.

14. The grain bin sump control of claim 13, wherein the unlocked position of the lock-out slide corresponds to the open center gate position, including a fully open center gate position of the center sump, and the lock-out position of the lock-out slide corresponds to the closed center gate position, including a partially closed center gate position that is at least half way from a fully closed center gate position to the fully open center gate position.

15. The grain bin sump control of claim 13, wherein the driving handle includes a sleeve extending from the driving handle, and the driving handle is mountable on each of the center sump control shaft and the intermediate sump control shaft by sliding the sleeve over the handle mounting end of the center sump control shaft and over the handle mounting end of the intermediate sump control shaft, respectively.

16. The grain bin sump control of claim 13, wherein the guide channel is a U-shaped channel and the lock-out slide includes a corresponding U-shaped slide base received in the U-shaped channel.

17. The grain bin sump control of claim 13, wherein each of the lock-out slide and the lock-out guide is formed of sheet metal pieces, and the sheet metal pieces are shaped so that no cut edges of any of the sheet metal pieces are engaged against any other part as the lock-out slide moves along the guide channel from the lock-out position to the unlocked position.

18. The grain bin sump control of claim 13, wherein the lock-out slide and the lock-out guide include a locking protrusion and a locking recess that are engaged with each other to prevent removal of the lock-out slide from the guide channel.

19. The grain bin sump control of claim 18, wherein the locking recess includes a first recess in the lock-out slide and a second recess in the lock-out guide, and the first and second recesses and the locking protrusion are each provided in an upwardly extending leg of a U-shaped channel of the lock-out guide and of a U-shaped slide base of the lock-out slide, respectively.

20. The grain bin sump control of claim 18, wherein the locking recess comprises a first recess in the lock-out slide and a second recess in the lock-out guide and the locking protrusion comprises a shaft extending through both the first and second recesses.

21. The grain bin sump control of claim 20, wherein the shaft is provided by a hasp of a padlock.

22. The grain bin sump control of claim 13, wherein a single piece of slide sheet metal forms the slide, including the rack, the blocking cover with the blocking cover leg, and a U-shaped slide base, and wherein the rack is provided on a first slide leg of the U-shaped slide base, and the blocking cover leg extends from the first slide leg of the U-shaped slide base and over the handle mounting end of the intermediate sump in the lock-out position.

23. The grain bin sump control of claim 22, wherein the guide channel is a U-shaped guide channel, and a first single piece of guide sheet metal having an L-shape that forms a first channel leg and a channel base of the U-shaped guide channel, and a second single piece of guide sheet metal having an L-shape that forms a second channel leg of the U-shaped guide channel and a support leg.

24. The grain bin sump control of claim 23, wherein the support leg of the second single piece of guide sheet metal is coupled to the sump control housing with the first single piece of guide sheet metal sandwiched between the support leg of the second single piece of guide sheet metal and the sump control housing.

25. The grain bin sump control of claim 24, wherein the second single piece of guide sheet metal has a U-shape that includes the L-shape and the blocking cover and the blocking cover leg extends from the first channel leg and adjacent the blocking cover leg in the lock-out position.

* * * * *

UNITED STATES PATENT AND TRADEMARK OFFICE
CERTIFICATE OF CORRECTION

PATENT NO. : 11,152,164 B2
APPLICATION NO. : 17/144827
DATED : October 19, 2021
INVENTOR(S) : Nathan W. Strehler et al.

It is certified that error appears in the above-identified patent and that said Letters Patent is hereby corrected as shown below:

In the Claims

Column 7, Line 54:
In Claim 1, "center sump control shaft" should be --intermediate sump control shaft--

Column 7, Line 56:
In Claim 1, "center sump control shaft" should be --intermediate sump control shaft--

Column 9, Line 19:
In Claim 13, "the center" should be --the intermediate--

Column 10, Line 56:
In Claim 25, "and the blocking cover and the" should be --and a cover support leg, and the--

Column 10, Line 57:
In Claim 25, "first channel leg" should be --first side leg--

Column 10, Line 58:
In Claim 25, "the blocking cover leg" should be --the cover support leg--

Signed and Sealed this
Thirtieth Day of May, 2023

Katherine Kelly Vidal
*Director of the United States Patent and Trademark Office*